(12) United States Patent
Dawson

(10) Patent No.: US 11,872,920 B2
(45) Date of Patent: Jan. 16, 2024

(54) AUTOMOBILE FOOT PEDAL FLOOR MAT HEEL GUARDS, KITS, AND METHODS

(71) Applicant: James Dawson, University Park, MD (US)

(72) Inventor: James Dawson, University Park, MD (US)

(*) Notice: Subject to any disclaimer, the term of this patent is extended or adjusted under 35 U.S.C. 154(b) by 0 days.

(21) Appl. No.: 17/569,649

(22) Filed: Jan. 6, 2022

(65) Prior Publication Data

US 2022/0212588 A1 Jul. 7, 2022

Related U.S. Application Data

(60) Provisional application No. 63/134,553, filed on Jan. 6, 2021.

(51) Int. Cl.
*B60N 3/04* (2006.01)
*B60N 3/06* (2006.01)

(52) U.S. Cl.
CPC ............ *B60N 3/048* (2013.01); *B60N 3/06* (2013.01)

(58) Field of Classification Search
CPC .......... B60N 3/06; B60N 3/046; B60N 3/048; B60N 3/044
USPC ................................. 296/75, 97.23
See application file for complete search history.

(56) References Cited

U.S. PATENT DOCUMENTS

| | | | |
|---|---|---|---|
| 1,431,623 A * | 10/1922 | Bernstein | G05G 1/60 74/563 |
| 1,680,442 A * | 8/1928 | Anderson | G05G 1/60 246/75 |
| 2,410,412 A * | 11/1946 | Hurford | G05G 1/60 74/564 |
| 2,444,342 A | 6/1948 | Edwards | |
| 2,680,385 A | 6/1954 | Estin | |
| 3,114,272 A * | 12/1963 | Sawyer | G05G 1/60 74/564 |
| 3,772,114 A * | 11/1973 | Kowalchuk | A41H 27/00 156/88 |
| 4,262,048 A | 4/1981 | Mitchell | |
| 4,749,602 A | 6/1988 | Russell | |
| 4,750,278 A | 6/1988 | Cates | |

(Continued)

FOREIGN PATENT DOCUMENTS

| | | |
|---|---|---|
| CA | 2880209 C | 6/2018 |
| EP | 0410939 A1 | 1/1991 |

(Continued)

OTHER PUBLICATIONS

Armor All 78961 4-Piece Grey Luxury Carpet Floor Mat [Retrieved from the internet Apr. 25, 2022].

(Continued)

*Primary Examiner* — Jason S Daniels
(74) *Attorney, Agent, or Firm* — Stevens & Showalter LLP

(57) ABSTRACT

Automobile accessories, kits, and methods of use. An automobile accessory is a heel guard that can be applied to a floor and/or a floor mat within an interior of an automobile such as a car, a truck, a van, a bus, and the like. The heel guard may be secured to the floor and/or the floor mat to provide a layer of protection between the driver's shoe or foot and the floor and/or floor mat. The heel guard prevents damage to these surfaces due to friction produced by movement of the driver's foot during operation of the foot pedals of the automobile.

19 Claims, 11 Drawing Sheets

(56) References Cited

U.S. PATENT DOCUMENTS

| | | |
|---|---|---|
| 4,779,295 A | 10/1988 | Johansen |
| 4,810,024 A | 3/1989 | Heller |
| 4,910,061 A * | 3/1990 | St. Julian ................. B32B 5/18 |
| | | 296/75 |
| 5,215,348 A * | 6/1993 | Wen-Hwang ............ B60N 3/04 |
| | | 296/97.23 |
| 5,312,151 A | 5/1994 | Krahn |
| 5,955,113 A * | 9/1999 | Jacino .................... B29C 73/10 |
| | | 29/402.09 |
| 6,296,919 B1 | 10/2001 | Rockwell, Jr. et al. |
| 6,340,514 B1 | 1/2002 | Kerr et al. |
| 7,121,571 B2 * | 10/2006 | Savage ................... B62J 23/00 |
| | | 74/564 |
| 7,449,228 B2 | 11/2008 | Mason |
| 9,216,678 B1 | 12/2015 | Mobley |
| 2004/0148725 A1 | 8/2004 | Blum et al. |
| 2010/0272944 A1 | 10/2010 | Engelhardt |
| 2013/0171419 A1 | 7/2013 | Tyler et al. |
| 2016/0304018 A1 * | 10/2016 | Chowdhury ........... B60N 3/048 |
| 2018/0310660 A1 | 11/2018 | Hines |

FOREIGN PATENT DOCUMENTS

| | | |
|---|---|---|
| GB | 2533149 B | 9/2019 |
| JP | 3038465 U * | 11/1996 |

OTHER PUBLICATIONS

BMW X3 (F25) Carpeted Floor Mats with Heel Pad [Retrieved from the internet Apr. 25, 2022].

Car Mats PVC Transparent w/ Unique Heel Pad [Retrieved from the internet Apr. 25, 2022].

Car Pass Waterproof Universal Fit Carpet Car Floor Mats [Retrieved from the internet Apr. 25, 2022].

ecoMats Custom Fit Carpet Floor Mats with Anti Slip Heel Pad [Retrieved from the internet Apr. 25, 2022].

\* cited by examiner

AUTOMOBILE FOOT PEDAL FLOOR MAT HEEL GUARDS, KITS, AND METHODS

CROSS-REFERENCE TO RELATED APPLICATIONS

Under provisions of 35 U.S.C. § 119(e), the Applicant claims the benefit of U.S. provisional application No. 63/134,553 filed Jan. 6, 2021, which is incorporated herein by reference. It is intended that the referenced application may be applicable to the concepts and embodiments disclosed herein, even if such concepts and embodiments are disclosed in the referenced application with different limitations and configurations and described using different examples and terminology.

FIELD

The disclosure relates to an automobile accessory as a heel guard that can be applied to a floor and/or a floor mat within an interior of an automobile such as a car, a truck, a van, a bus, and the like. The heel guard may be secured to the floor and/or the floor mat to provide a layer of protection between the driver's shoe or foot and the floor and/or floor mat. The heel guard prevents damage to these surfaces that would otherwise occur due to friction.

BACKGROUND

Consumers use automobiles for daily travel and driving responsibilities. During use of an automobile with a manual transmission, the driver operates the clutch pedal, the accelerator pedal, and the brake pedal, and during use of an automobile with an automatic transmission, the driver operates the accelerator pedal and the brake pedal. It is typical for the driver's heel to contact the floor of the automobile while driving, and the driver's foot rocks and moves as the driver operates the pedals. This movement causes friction and damage to various surfaces involved, including the driver's shoe or foot, the vehicle floor, and/or the vehicle floor mats. Furthermore, this movement may cause excessive wear and tear on the driver's right shoe, which may cause uneven wear relative to the left shoe.

Consistent driving may cause moisture or dirt to accumulate on the car floorboard and/or floor mat which causes stains on both the person's shoe and floor mat and may facilitate the aforementioned damages. Furthermore, when driving long distances, the pressure on a person's heel can cause pain or discomfort. In many situations, there is no solution to this wear and tear on the vehicle floor surface, floor mat, and the damage to driver's shoe. The conventional strategy is to replace or repair the shoe or replace the worn floor mat, however, this approach is unsatisfactory because it is costly and is generally not a long-term solution.

Accordingly, there remains a need for improved articles, kits, and methods for protecting a driver-side floor and/or floor mat of an automobile. This and other needs are satisfied by various aspects of the present disclosure.

SUMMARY

An improved heel guard, an improved floor mat having a heel guard attached thereto, and related kits and methods, are provided for protection of automobile floor mats, automobile floors, driver shoes, and driver feet during use of the automobile. In various aspects, the improved heel guard is smaller than a floor mat and may be used to repair and/or protect the floor mat and/or the floor from damage due to wear and tear. The heel guard may be applied to the floor and/or the floor mat and secured thereto by one or more suitable adhesives. The heel guard may be comprised of any suitable material, including but not limited to rubber, plastic, synthetic chemical compounds, natural compounds, water resistant compounds, odor repellent compounds, and/or any other effective materials. During use, the driver's shoe (or foot) rests on the heel guard, which captures debris such as soil, water, sand, oil, organic matter, and the like, from the driver's shoe or foot, and prevents these materials from contacting the floor and/or the floor mat. This enables the floor and/or the floor mat to remain drier and cleaner and to be protected from friction and damage caused by operation of the automobile pedals.

An improved heel guard may be provided with and used in combination with one or more adhesive materials. An adhesive may be a tape or sheet adhesive having one or more adhesive substances on one or more surfaces thereof. A first adhesive may be used alone or in combination with a second adhesive to secure the heel guard to the floor and/or the floor mat. If there is a hole or other large defect in the floor mat, such that the floor is contactable through the hole, it may be desirable that the adhesive does not contact the floor through the hole. In such instances, the adhesive may be altered to include an aperture, sized to the hole and positioned at an interface between the hole of the floor mat and the heel guard, such that the adhesive does not contact the floor when the heel guard is secured to the floor mat with the adhesive. Alternately, in such instances, an intermediate material, such as a piece of paper or other material, may be sized to the hole and positioned at the interface between the hole of the floor mat and the heel guard, such that the intermediate material contacts the adhesive at that position and prevents the adhesive from contacting the floor when the heel guard is secured to the floor mat with the adhesive. Alternately, in such instances, the adhesive may be applied to the heel guard around an outer perimeter of the bottom of the heel guard such that center portions of the bottom of the heel guard are not secured to the floor mat with the adhesive and the adhesive does not contact the floor through the hole in the floor mat.

A heel guard includes two long edges and two short edges which form a rounded rectangle. A contact surface is depressed within the heel guard and is defined by an elevated ridge positioned around a perimeter of the heel guard. A plurality of friction grooves extends into the contact surface a certain depth so as to provide additional grip to the driver's shoe during use. In addition, water, dirt, oils, and other materials from the driver's shoe may collect within a volume defined by the contact surface and the edges instead of being deposited onto the floor mat. In this manner, the floor mat is not additionally degraded by these materials, which would weaken the structure of the floor mat and make it more susceptible to breakage due to friction during use.

A kit is provided, for repair and/or maintenance of a floor mat, which contains the heel guard, optionally combined with one or more adhesive materials such as one or more glues and/or one or more adhesive sheets, and the like. In some instances, only one adhesive material may be provided as a double-sided adhesive sheet or tape, which can be applied to the bottom of the heel guard and then contacted with the floor mat to secure the heel guard to the floor mat. In other instances, two or more adhesive materials may be provided as double-sided adhesive sheets or tapes; in such instances, a first adhesive material may be applied to the floor mat and a second adhesive material may be applied to the bottom of the heel guard. Thereafter, the first and second adhesive materials may be contacted together, and the heel guard pressed downward against the floor mat to bond the heel guard to the floor mat for use.

Methods of installing the heel guard to a floor mat are also provided and include applying a first adhesive to the floor mat, applying a second adhesive to a bottom of the heel guard, and contacting the first adhesive to the second adhesive. The method may include other steps, such as cutting an aperture into one or more of the adhesives that fits over a hole of the floor mat to prevent the adhesive(s) from contacting a floor of the automobile or preparing and inserting an intermediate material between adhesive(s) and the hole of the floor mat for the same purpose. A method of using the heel guard includes resting a heel of a driver's foot or shoe on the heel guard and operating the automobile.

In various aspects, the heel guard devices, kits, and methods may not exclude other structural elements, items, features, steps, and the like, and in this respect, these and other aspects of the disclosure may be combined with other structural elements, items, features, steps, and the like in a particular implementation as needed or desired. However, in some aspects, the heel guard devices, kits, and methods may consist of or may consist essentially of those structural elements, items, features, steps, and the like which are expressly disclosed herein, and may exclude certain other structural elements, items, features, steps, and the like in a particular implementation to provide a minimum set of features for functionality of these aspects.

Additional aspects of the present disclosure will be set forth in part in the description which follows, and in part will be apparent from the description, or can be learned by practice of the present disclosure. The advantages of the present disclosure will be realized and attained by means of the elements and combinations particularly pointed out in the appended claims. It is to be understood that both the foregoing general description and the following detailed description are descriptive and explanatory only and are not restrictive of the present disclosure, as claimed.

BRIEF DESCRIPTION OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1B:
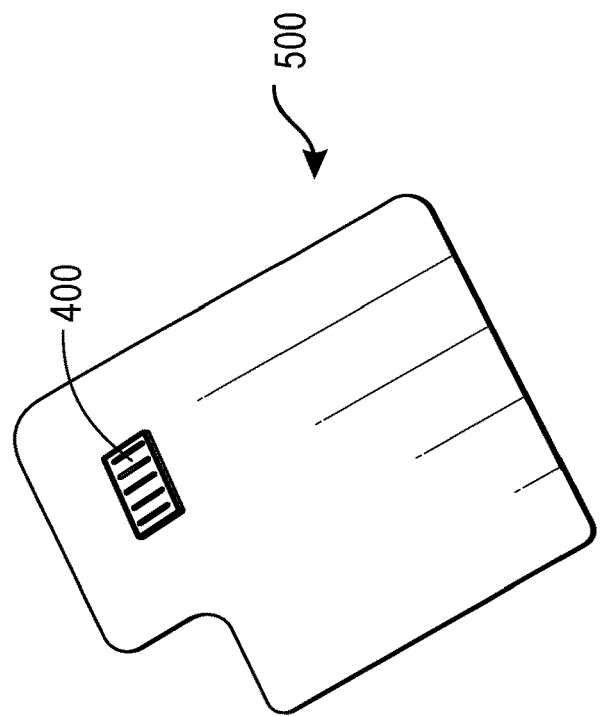
FIG. 1B depicts a top view of the minimally worn floor mat improved with a heel guard attached thereto in accordance with an embodiment of the present disclosure.

Reference is made herein to the attached drawings. Like reference numerals may be used in the drawings to indicate like or similar elements of the description. The figures are intended for representative purposes and should not be considered limiting.

The present disclosure can be understood more readily by reference to the following detailed description of the present disclosure and the examples included therein.

Before the present articles, systems, devices, and/or methods are disclosed and described, it is to be understood that they are not limited to specific implementations unless otherwise specified, or to particular approaches unless otherwise specified, as such can, of course, vary. It is also to be understood that the terminology used herein is for the purpose of describing aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

Definitions

It is to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this present disclosure belongs. In this specification and in the claims which follow, reference will be made to a number of terms which shall be defined herein.

As used in the specification and the appended claims, the singular forms "a," "an," and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the present disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the present disclosure. Thus, if there are a variety of additional steps that can be performed it is understood that each of these additional steps can be performed with any specific aspect or combination of aspects of the methods of the present disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Heel Guard Devices

Generally, the disclosure relates to improved heel guards that may be applied to a surface to protect the surface from damage due to contact with another surface, such as a heel of a driver's shoe or a heel of the driver's foot. The heel guard may be secured to the surface, e.g., a floor and/or a floor mat of the vehicle, using one or more suitable adhesives. Once the heel guard is secured, the surfaces are protected from damage and deterioration due to friction resulting from repeated surface-to-surface interactions. The heel guard includes one or more protective substrate layers comprised of rubber, plastic, synthetic chemical compounds, natural compounds, water resistant compounds, odor repellent compounds, and/or other effective compounds. The heel guard may be referred herein or elsewhere with one or more of the following terms: a mat protector, a floor mat heel guard, a MatMate™ device or product, and the likeness thereof, which may hereinafter be referred to a heel guard.

Figure 1A:
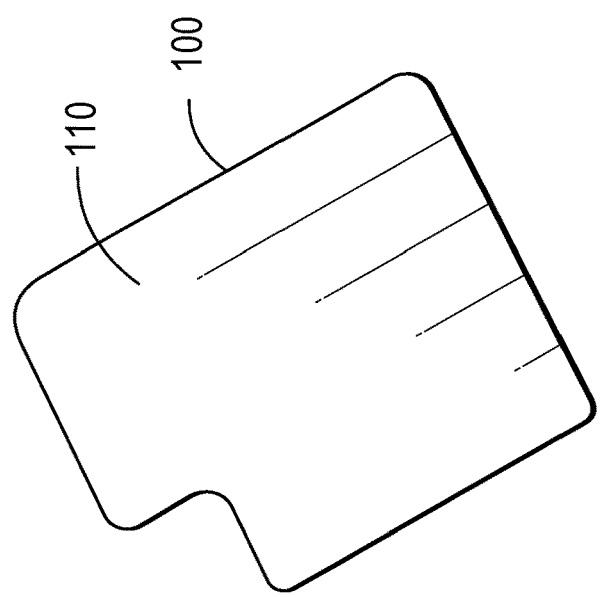
FIG. 1A depicts a top view of a minimally worn floor mat in accordance with an embodiment of the present disclosure.

Generally, the heel guard may be used on a minimally worn floor mat, a moderately worn floor mat, and/or a maximally worn floor mat, according to need. Referring now to FIG. 1A, there is depicted a top view of a minimally worn floor mat. A minimally worn floor mat 100 includes a minimally worn space 110, positioned adjacent to a cutout of the floor mat, which has little or no damage thereon. The minimally worn space 110 may be at risk of becoming damaged, in the future, due to contact with the driver's heel, and may be protected by preemptively applying a heel guard 400 to the space 110 to produce an improved floor mat 500, as shown in FIG. 1B.

In accordance with the purposes of the present disclosure, as embodied and broadly described herein, the present disclosure, in one aspect, relates to an improved heel guard 400 providing protection for vehicles of various conditions. Per applicant's detailing experience, vehicle floor mats may be categorized in a plethora of wear conditions. Regarding use of the improved heel guard, applicant has categorized the conditions of floor mats in at least one or more of the following conditions. In at least one embodiment, as depicted in FIG. 1A and FIG. 1B, the first condition is that of a brand-new floor mat, where the wear and tear has not developed at all. This is a rare condition and ends shortly after a vehicle is sold and put into use. Heel guard 400 may be configured to serve to prevent wear from developing on the floor mats in brand new condition.

Figure 2B:
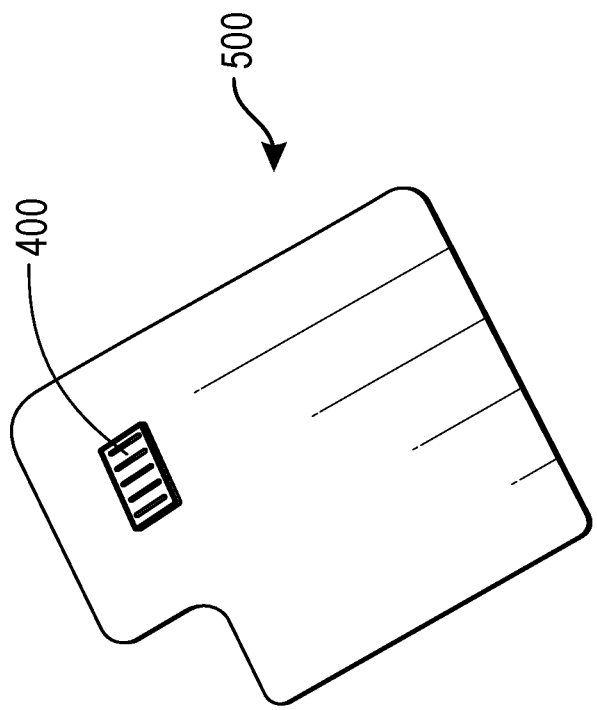
FIG. 2B depicts a top view of the moderately worn floor mat improved with a heel guard attached thereto in accordance with an embodiment of the present disclosure.
Figure 2A:
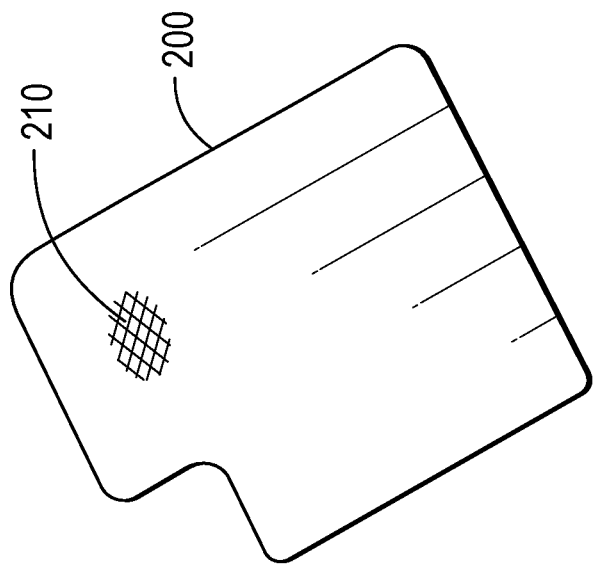
FIG. 2A depicts a top view of a moderately worn floor mat in accordance with an embodiment of the present disclosure.

Referring now to FIG. 2A, there is depicted a top view of a moderately worn floor mat. A moderately worn floor mat 200 includes a moderately worn space 210, positioned adjacent to a cutout of the floor mat, which has a moderate amount of damage thereon. The moderately worn space may be at risk of becoming increasingly damaged, in the future, due to contact with the driver's heel, and may be protected by preemptively applying a heel guard 400 to the space 210 to produce an improved floor mat 500, as shown in FIG. 2B.

In at least one embodiment, as depicted in FIG. 2A and FIG. 2B, the second type of condition is when a mat has a "bald spot," or worn-down fibers at the heel, from normal driving. The focal area or wear spot is unsightly and the improved heel guard 400 functions to prevent further damage, and to cover up the unsightly spot as depicted and shown in FIG. 2A and FIG. 2B.

Figure 3B:
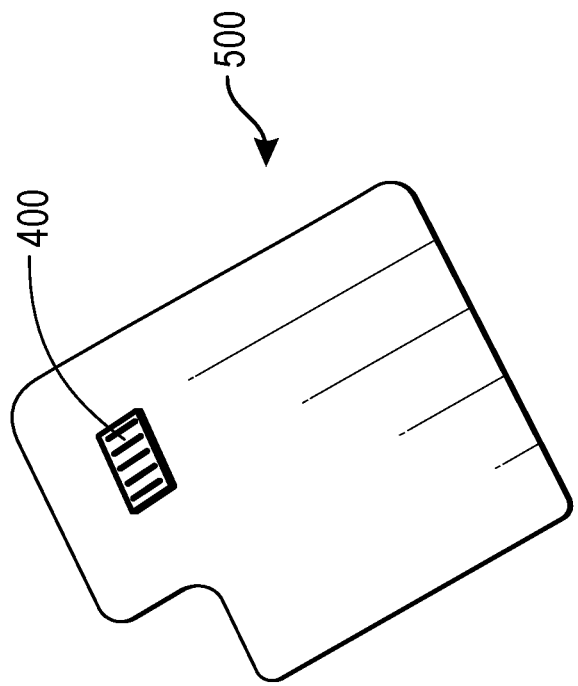
FIG. 3B depicts a top view of the maximally worn floor mat improved with the heel guard attached thereto in accordance with an embodiment of the present disclosure.
Figure 3A:
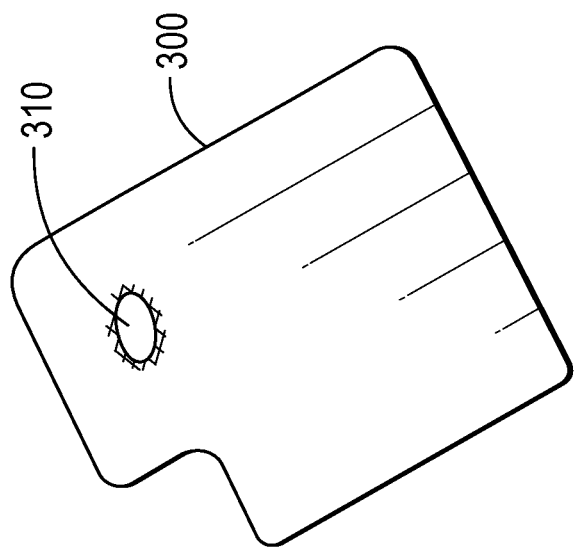
FIG. 3A depicts a top view of a maximally worn floor mat in accordance with an embodiment of the present disclosure.

Referring now to FIG. 3A, there is depicted a top view of a maximally worn floor mat. A maximally worn floor mat 300 includes a maximally worn space 310, positioned adjacent to a cutout of the floor mat, which has a maximum amount of damage thereon. The maximally worn space 310 may be a hole, as shown, and may not be at risk of becoming more damaged due to contact with the driver's heel due to the driver's heel contacting the underlying floor through the hole of the maximally worn space 310. However, the underlying floor, positioned below the maximally worn floor mat 300 in the vehicle, may be protected from further damage by applying a heel guard 400 to the space 310 to produce an improved floor mat 500, as shown in FIG. 3B.

In at least one embodiment, as depicted in FIG. 3A and FIG. 3B, the third type of condition which could be considered the worst condition is common on older/high mileage vehicles. This third type of condition is where the "bald spot" has developed into a hole in the floor mat as depicted and shown at 310 of FIG. 3A. When the adhesive is used with the improved heel guard 400 for floor mats in this condition, the improved heel guard 400 could potentially stick or adhere to the surface under the hole which could cause further damage to the vehicle floor surface and the vehicle floor mat.

Figure 4:
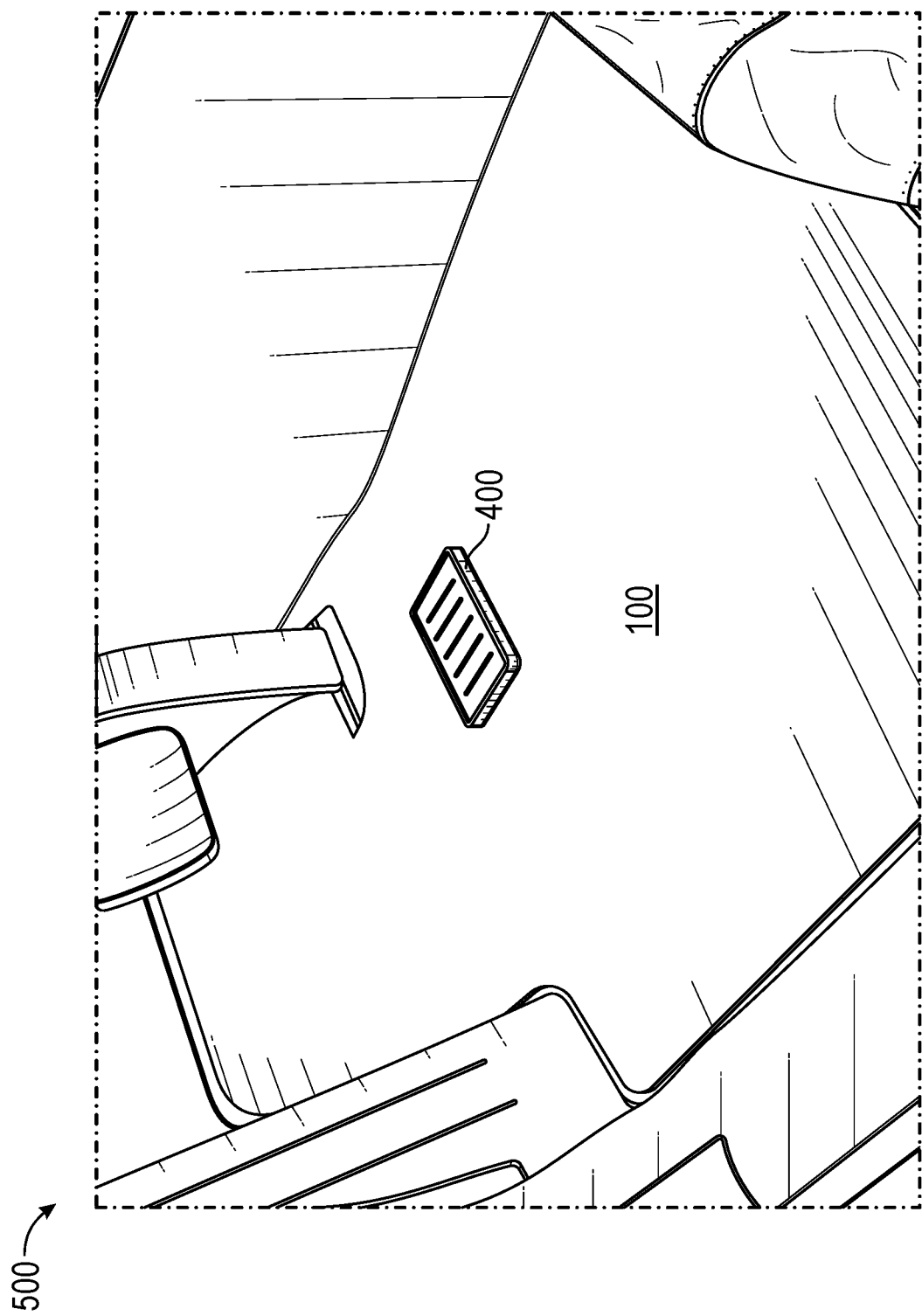
FIG. 4 depicts a perspective view of an improved floor mat with a heel guard attached thereto in accordance with an embodiment of the present disclosure.

Referring now to FIG. 4, there is depicted a perspective view of an improved floor mat with a heel guard attached thereto. An improved floor mat 500 may be produced by placement of a heel guard 400 over a portion of a driver's seat floor 100 of a vehicle and secured to the floor 100, as shown. The improved floor mat 500 mitigates initialization and progression of damage to the floor and the heel of the driver's shoe. An advantage of the heel guard 400 is that in certain instances, it is removable from the floor mat, which makes it easy to clean in case of dirt or moisture accumulation. However, in other instances, the heel guard 400 may be permanently affixed to the vehicle floor mat. In certain aspects, the heel guard 400 may provide a certain amount of cushioning for the driver's heel to add comfort and prevent pain or discomfort when driving long distances. The heel guard 400 may be small enough to be secured to any floor surface, and in certain aspects, may be weatherproof and/or tamper resistant.

Figure 5A:
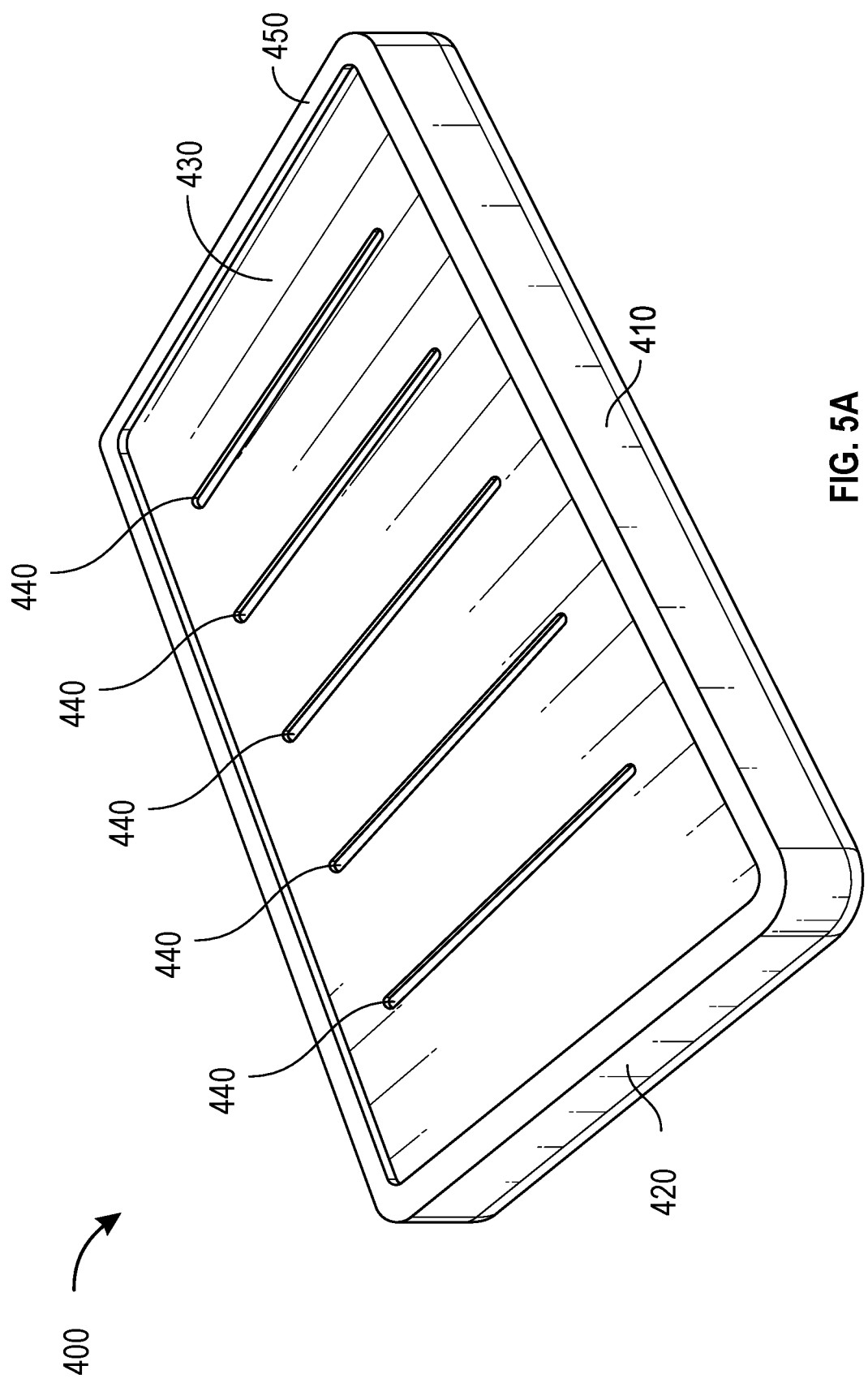
FIG. 5A depicts a perspective view of an exemplary heel guard in accordance with an embodiment of the present disclosure.
Figure 5B:
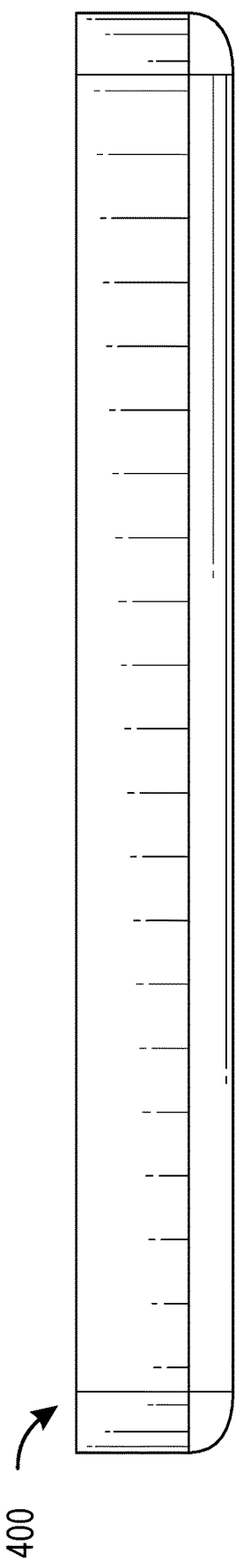
FIG. 5B depicts a left side view of the exemplary heel guard in accordance with an embodiment of the present disclosure.
Figure 5C:
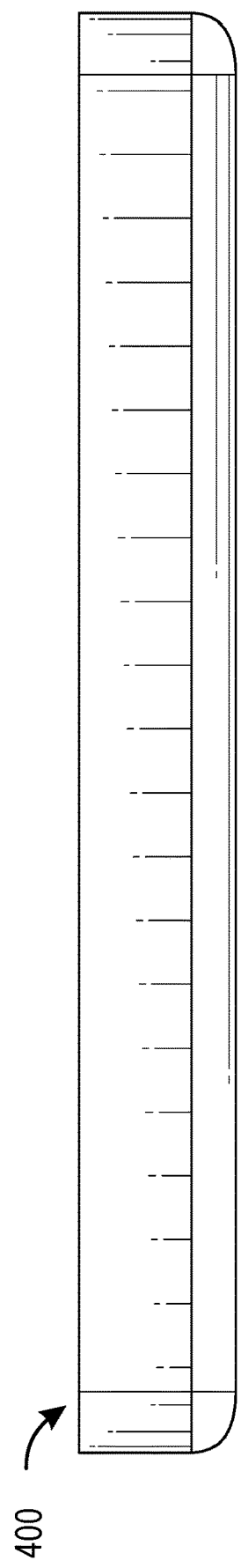
FIG. 5C depicts a right side view of the exemplary heel guard in accordance with an embodiment of the present disclosure.
Figure 5E:
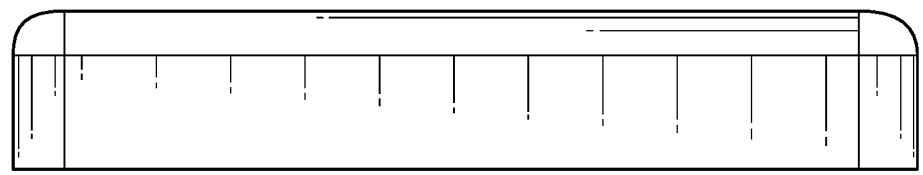
FIG. 5E depicts a back side view of the exemplary heel guard in accordance with an embodiment of the present disclosure.
Figure 5D:
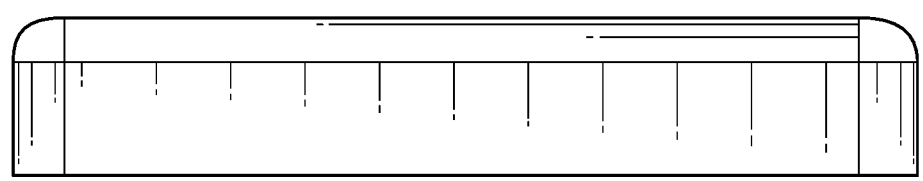
FIG. 5D depicts a front side view of the exemplary heel guard in accordance with an embodiment of the present disclosure.
Figure 5F:
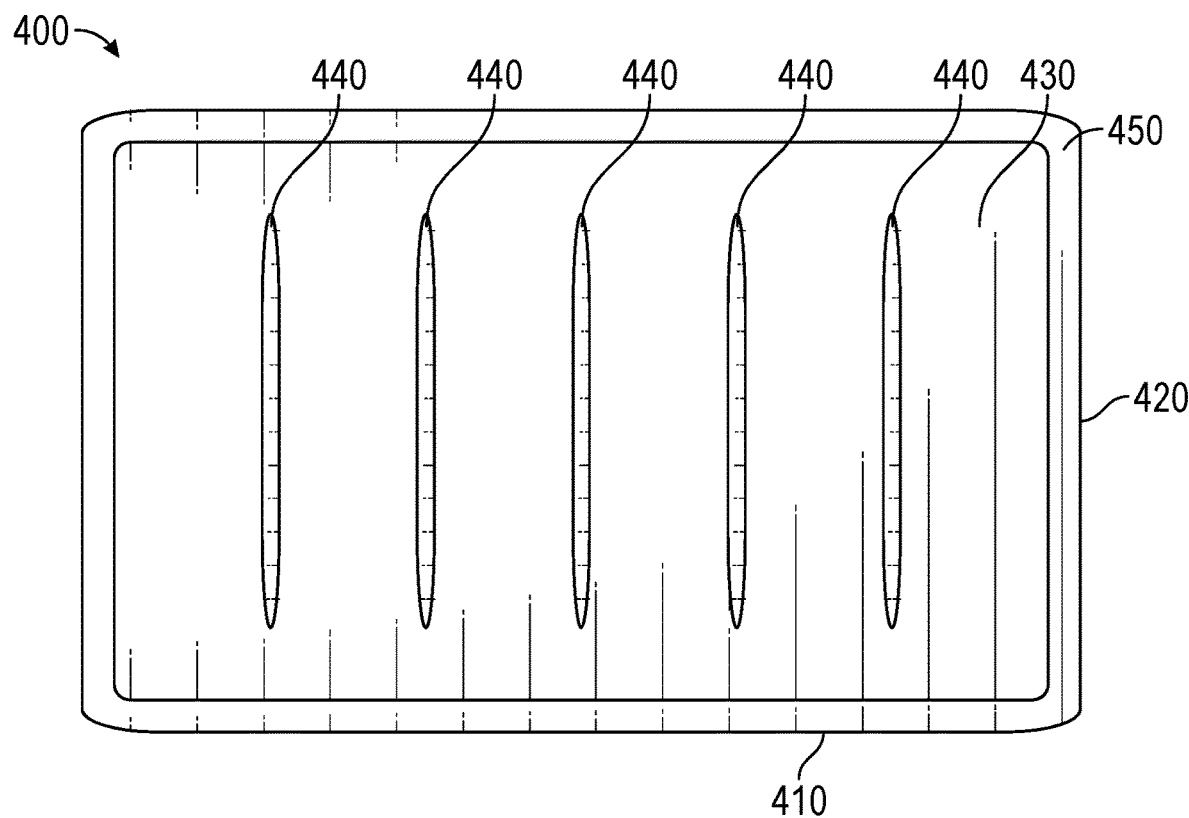
FIG. 5F depicts a top view of the exemplary heel guard in accordance with an embodiment of the present disclosure.
Figure 5G:
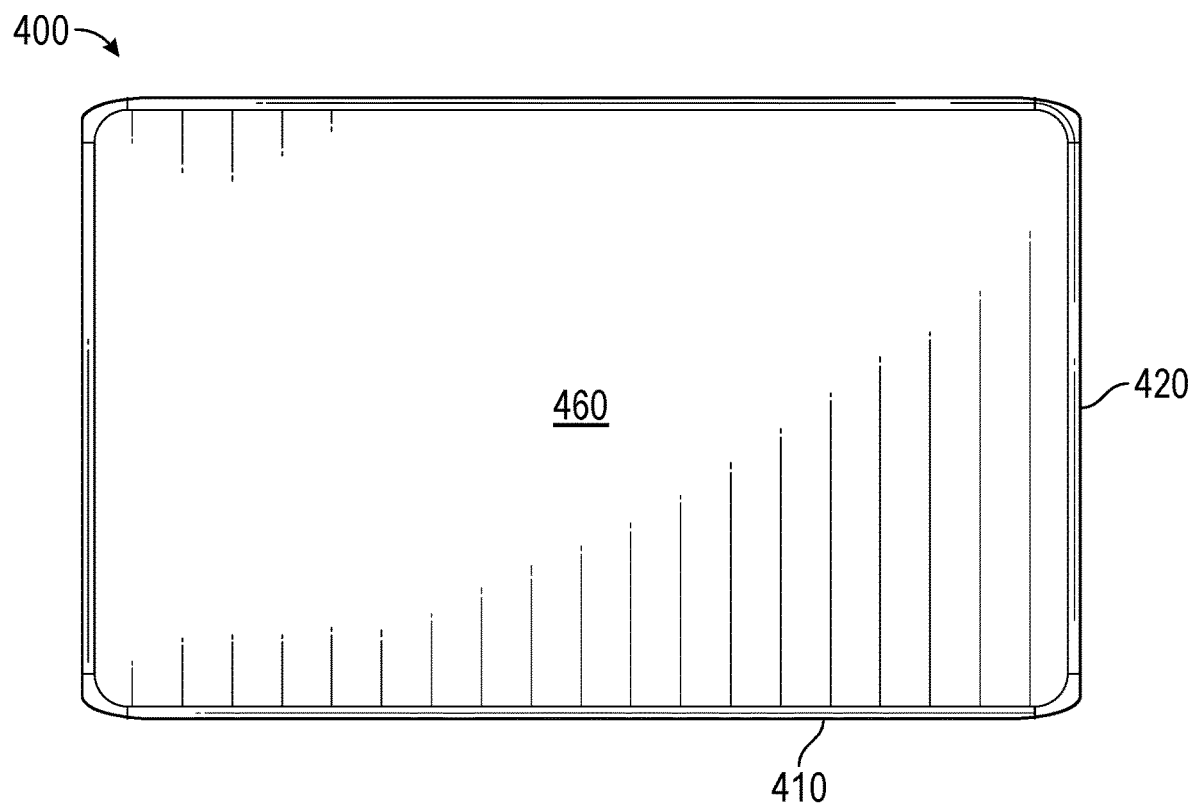
FIG. 5G depicts a bottom view of the exemplary heel guard in accordance with an embodiment of the present disclosure.
Figure 6A:
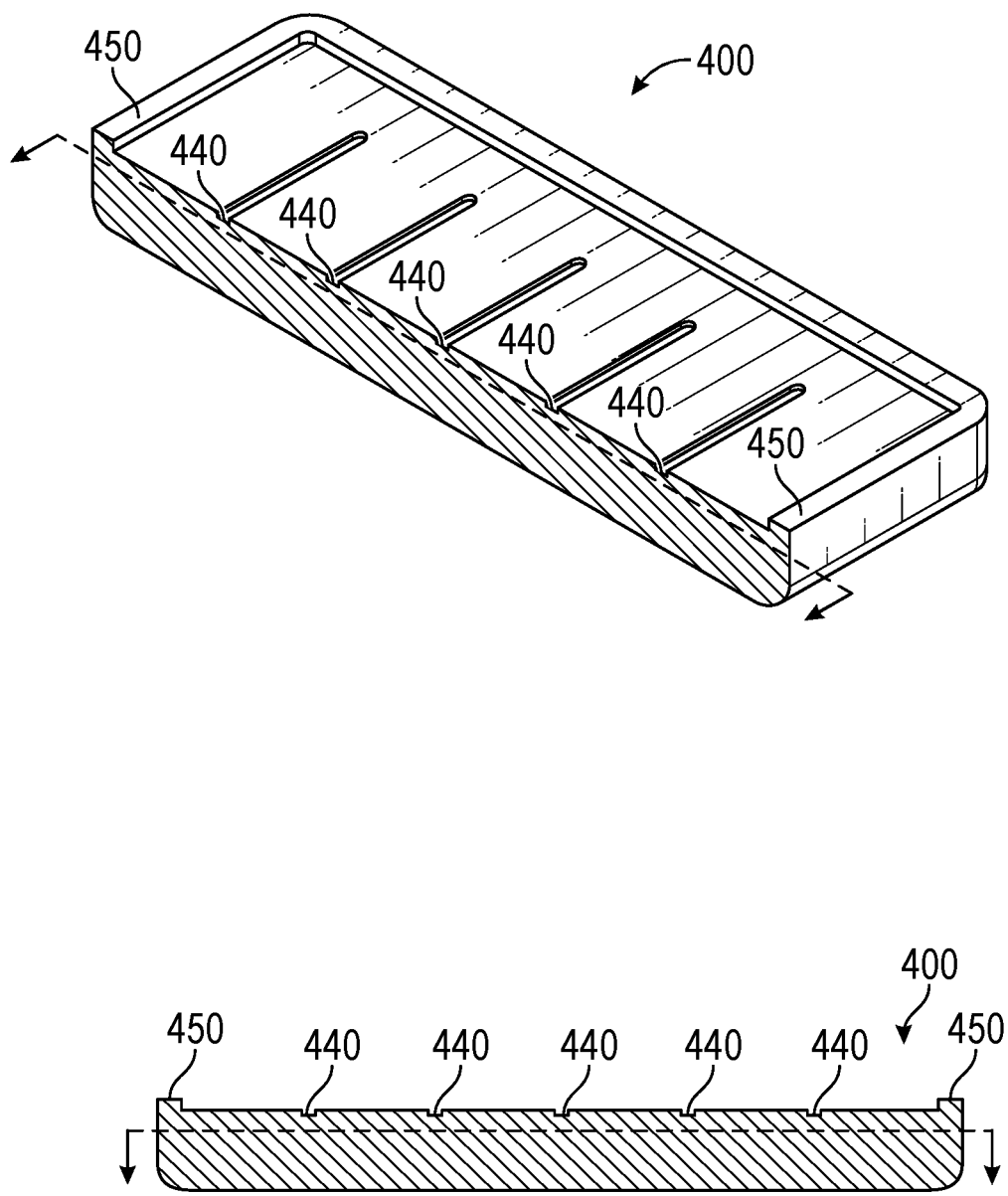
FIG. 6A depicts a perspective cross-sectional view (top) and a side cross-sectional view (bottom) of the exemplary heel guard in accordance with an embodiment of the present disclosure.

Referring now to FIGS. 5A-5G and 6A, there are depicted several views of an exemplary heel guard (FIGS. 5A-5G) and a perspective cross-sectional view (top) and a side cross-sectional view (bottom) of the exemplary heel guard (FIG. 6A). A heel guard 400 includes a rectangular body comprised of two long edges 410 and two short edges 420 which, in the shown embodiment, form a rounded rectangle. A contact surface 430 is depressed within the heel guard 400 and is defined by an elevated ridge 450 positioned around a perimeter of the heel guard 400. A plurality of friction grooves 440 extend into the contact surface 430 a certain depth so as to provide additional grip to the driver's shoe during use. In addition, water, dirt, oils, and other materials from the driver's shoe may collect within a volume defined by the contact surface 430 and the elevated ridge 450 instead of being deposited onto the floor mat. In the shown embodiment, the volume also includes the friction grooves 440. With this volume, the heel guard catches debris materials from the driver's shoe or foot and the floor mat is not additionally degraded by these materials, which would weaken the structure of the floor mat and make it more susceptible to breakage due to friction during use.

Figure 6B:
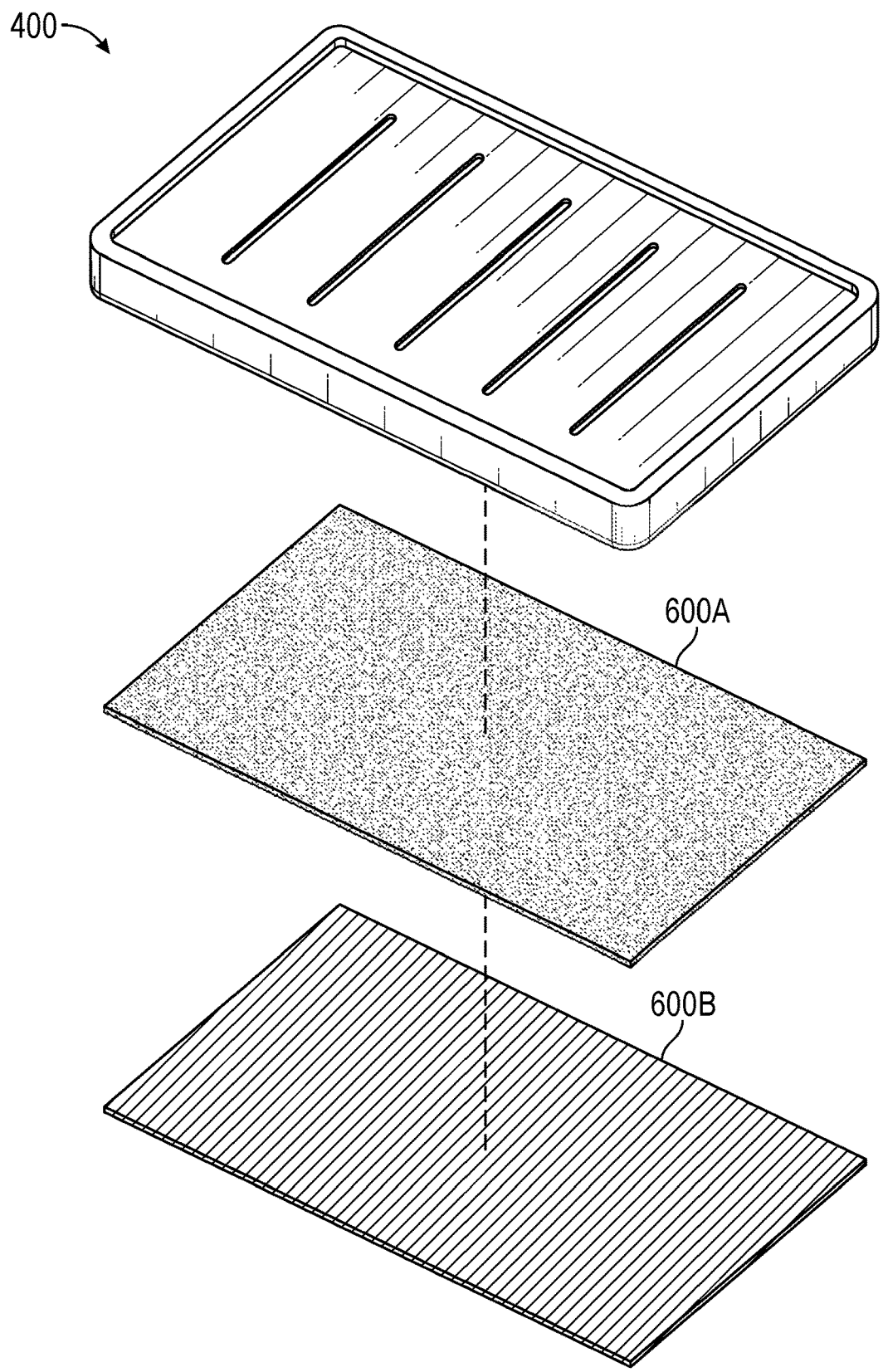
FIG. 6B depicts a perspective view of the exemplary heel guard next to a plurality of adhesives that may be used to attach the heel guard to a surface such as a floor mat and/or a floor of an automobile in accordance with an embodiment of the present disclosure.

Referring now to FIG. 6B, there is depicted a perspective view of the exemplary heel guard next to a plurality of adhesives that may be used to attach the heel guard to a surface such as a floor mat and/or a floor of an automobile. A method of securing a heel guard of the disclosure includes applying a first adhesive 600B to a portion of a floor mat and/or a floor of a vehicle (not shown), applying a second adhesive 600A to a bottom surface of the heel guard 400, and contacting the first adhesive 600B with the second adhesive 600A to form a bond therebetween. The first and second adhesives 600B, 600A may each be double sided adhesives. The bond may be established and/or strengthened by applying a sustained pressure to the heel guard 400 for a threshold time period necessary for the adhesives 600B, 600A to cure and hold the heel guard in place relative to the floor and/or floor mat.

The adhesive may be comprised of one or more of: a tape like adhesive, rubber adhesive, structural adhesive, pressure sensitive adhesive, adhesive paste, adhesive film, adhesive resin, two part adhesive, hot melt adhesive, organic solvent adhesive, plastisol adhesive, water-based adhesive, epoxies, silicone adhesives, urethanes, methyl methacrylates, anaerobic adhesive, cyanoacrylates, heat cure adhesives, moisture cure adhesives, radiation cure adhesives, silicones, pressure sensitive tape, and/or other known adhesives.

The heel guard may be comprised of one or more of: custom molded rubber, silicone, adhesive rubber, commercial grade rubber, FDA grade rubber, high grade rubber, natural rubber, India rubber, gum rubber, latex, neoprene rubber, chloroprene, silicone rubber, polysiloxane, nitrile rubber, NBR, vinyl, Ethylene Propylene Diene Monomer (EPDM) rubber, styrene-butadiene (SBR) rubber, butyl rubber, isobutylene isoprene, fluorosilicone rubber (FVMQ), polyurethane, fluorocarbon rubber (FKM), santoprene, thermoplastic vulcanizate (TPV) rubber, plastic, acrylic rubber (ACM), perfluoroelastomer (FFKM) rubber, acrylic (PMMA), polycarbonate (PC), fiberglass, acetal, polyoxymethylene (POM), boltaron thermoplastic, borated polyethylene (PE), nylon, polypropylene (PP), styrene, worbla, ultem, polyethylene terephthalate (PETE), polyvinyl chloride (PVC), polystyrene (styrofoam), polylactic acid (PLA), acrylonitrile butadiene styrene (ABS), thermoplastics, thermoset plastics, thermosetting plastics, polytetrafluoroethylene (Teflon), polyvinylidine Chloride (Saran), BPA free plastic, other elastomers, other polymers, wood, and/or other materials.

In various aspects, the heel guards and other items disclosed herein may include one or more varieties or combinations of one or more elements, components, members, devices, and/or apparatuses. Such variations are within the scope of the present disclosure.

Heel Guard Kits

A kit is provided, for repair and/or maintenance of a floor mat, which contains one or more heel guards, optionally combined with one or more adhesive materials such as one or more glues and/or one or more adhesive sheets, tapes, and/or another adhesive material or substance. In some instances, only one adhesive material may be provided as a double-sided adhesive sheet or tape, which can be applied to the bottom of the heel guard and then contacted with the floor mat to secure the heel guard to the floor mat. In other instances, two or more adhesive materials may be provided as double-sided adhesive sheets or tapes; in such instances, a first adhesive material may be applied to the floor mat and a second adhesive material may be applied to the bottom of the heel guard. Thereafter, the first and second adhesive materials may be contacted together, and the heel guard pressed downward against the floor mat to bond the heel guard to the floor mat for use. The kit may be provided with the heel guard and adhesive(s), optionally combined with other suitable items for a kit, such as instructions for use and/or applying the heel guard to the floor mat. The instructions may inform a user about how to perform one or more methods of the present disclosure.

Heel Guard Methods

A method for securing an improved heel guard to a surface includes: applying an adhesive to a bottom surface of the heel guard and/or the surface; placing the heel guard on the surface (which may be a vehicle floor or a vehicle floor mat); and applying pressure to a top surface of the heel guard thereby bonding the adhesive and securing the heel guard to the surface. The adhesive may include: a tape like adhesive, rubber adhesive, structural adhesive, pressure sensitive adhesive, adhesive paste, adhesive film, adhesive resin, two part adhesive, hot melt adhesive, organic solvent adhesive, plastisol adhesive, water-based adhesive, epoxies, silicone adhesives, urethanes, methyl methacrylates, anaerobic adhesive, cyanoacrylates, heat cure adhesives, moisture cure adhesives, radiation cure adhesives, silicones, pressure sensitive tape, and/or any other suitable adhesive(s).

In various implementations, the adhesive may be applied to be contiguous to the bottom surface of the heel guard or may be placed around the edges of the heel guard, to prevent the adhesive from contacting central portions of the bottom surface of the heel guard and portions of the floor mat thereunder. In other implementations, the adhesive may be applied to cover at least a majority of the bottom surface of the heel guard, such that at least the majority of the bottom surface of the heel guard is adhered to the floor mat thereunder.

If there is a hole in the floor mat such that there may be a risk of adhering the heel guard to the floor under the floor mat through the hole, an aperture may be cut into the adhesive to prevent the adhesive from contacting the floor under the floor mat through the hole. Alternately, a suitable intermediate material (e.g., paper, plastic, etc.) may be sized and configured to be placed over the hole of the floor mat to prevent the adhesive from contacting the floor through the hole, and in such instances, the adhesive may be kept intact and may contact the intermediate material during attachment of the heel guard to the floor mat.

Figure 7:
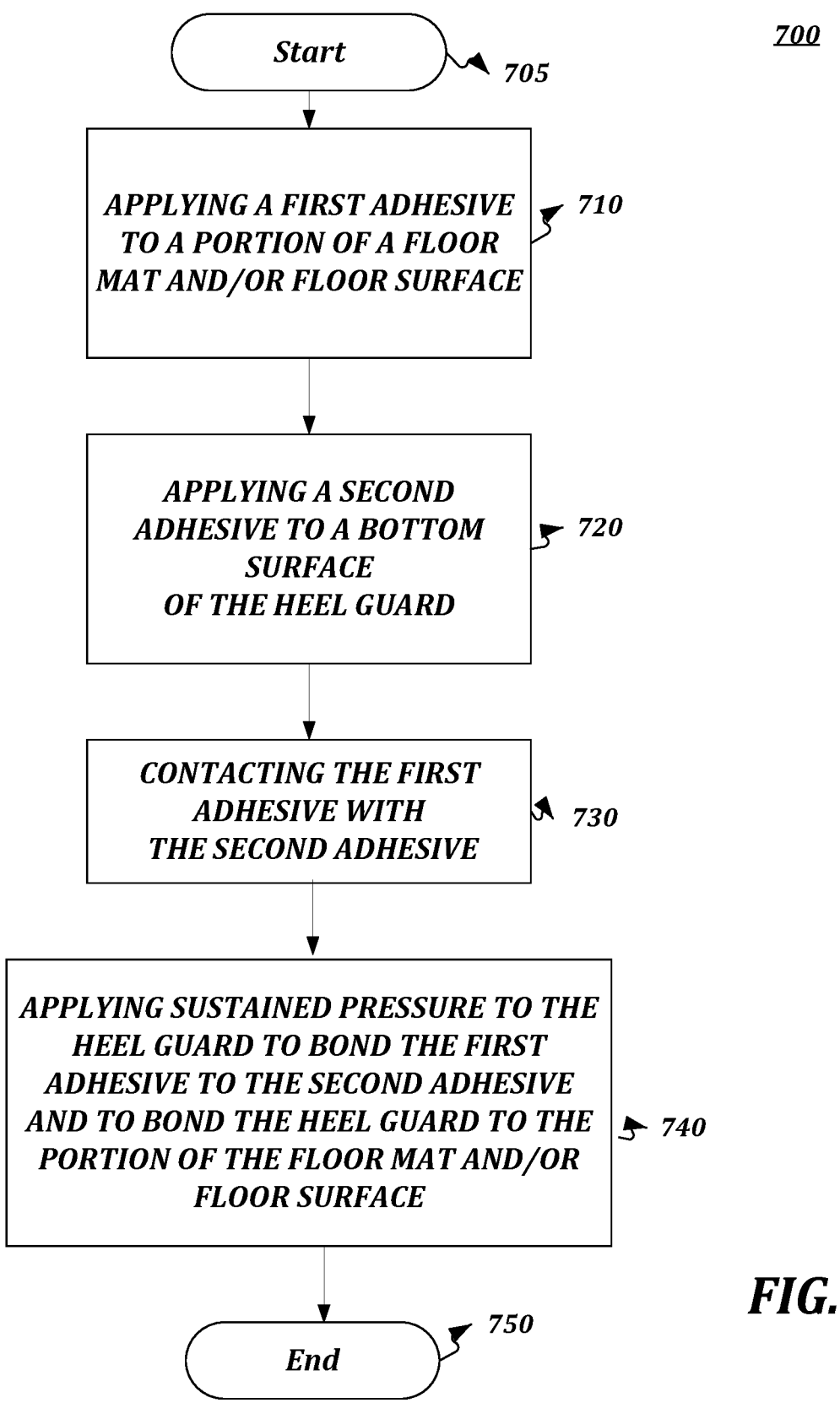
FIG. 7 depicts a method of using an exemplary heel guard in accordance with an embodiment of the present disclosure.

In other aspects, as depicted in FIG. 7, the present disclosure shows a method of using an improved heel guard in accordance with an embodiment of the present disclosure (e.g., as shown in FIG. 5A). FIG. 7 is a flow chart setting forth the general stages involved in a method 700 for applying an improved heel guard 400 to a surface, such as a portion of a floor surface and/or a portion of a floor mat. Method 700 may be implemented, in whole or in part, and in any suitable order, using an improved heel guard 400 as described in more detail with respect to FIGS. 5A-5G herein.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 700 will be described in greater detail below.

Method 700 may begin at starting block 705 and proceed to stage 710 where an improved heel guard (e.g., 400 of FIG. 5A) may be utilized by a user applying a first adhesive to a designated area of a floor surface. For example, applying the improved heel guard to a vehicle floor mat. Method 700 may advance to stage 720 where a second adhesive may be applied to the bottom surface of the improved heel guard, and method 700 may continue to stage 730 where the improved heel guard may be placed on the designated area of the floor surface. After the improved heel guard is placed on the designated area of the floor surface in stage 730, such that the first adhesive is contacted with the second adhesive, the method 700 may proceed to stage 740 where a sustained pressure is applied to the improved heel guard for a threshold time period necessary for the first and second adhesive to cure and hold in place contiguous to the improved heel guard and the vehicle floor mat. Once the improved heel guard has sustained pressure applied by the user to the improved heel guard for a threshold time period necessary for the first and second adhesive to cure and hold in place contiguous to the improved heel guard and the vehicle floor mat in stage 740, method 700 may then end at stage 750. Alternatively, method 700 could continue starting over at 710 as the owner or user applies more improved heel guards to additional vehicle floor mats.

In the shown method 700, an individual may perform steps 710, 720, 730, and 740 as part of a process for securing the heel guard to the floor mat and/or the floor surface. However, in certain implementations of the method, the individual may perform different steps. For example, in implementations, the adhesive (may be the first and/or second adhesive) may be applied to only the bottom surface of the heel guard, and then the bottom surface of the heel guard may be contacted to the floor mat and/or the floor surface (without the adhesive thereon) and the sustained pressure applied to the heel guard to bond the bottom surface of the heel guard to the floor mat and/or the floor surface. As another example, in other implementations, the adhesive (may be the first and/or second adhesive) may be applied to only the floor mat and/or the floor surface, and then the bottom surface of the heel guard (without the adhesive thereon) may be contacted to the floor mat and/or the floor surface and the sustained pressure applied to the heel guard to bond the bottom surface of the heel guard to the floor mat and/or the floor surface. In any method of the disclosure, the first adhesive may be the same adhesive as the second adhesive, or alternatively, the first adhesive may be different from the second adhesive.

In various instances, there may be a hole or other significant damage to the floor mat and/or the floor surface, and as a result, there may be no structure at the position of the hole which can be secured with the adhesive. If this is the case, the adhesive may be applied around a perimeter of the bottom surface of the heel guard, and/or around a perimeter of the relevant portion of the floor mat and/or the floor surface, such that the heel guard can be secured to the floor mat and/or the floor surface without introducing the adhesive into the hole of the floor mat and/or the floor surface. Alternately, in such instances, an intermediate material, such as a piece of paper or other material, may be sized to the hole and positioned at the interface between the hole of the floor mat and the heel guard, such that the intermediate material contacts the adhesive at that position and prevents the adhesive from contacting the floor when the heel guard is secured to the floor mat with the adhesive. In this manner, the adhesive does not interact with the hole of the floor mat and the heel guard is effectively secured to the floor mat.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior present disclosure. Further, the dates of publication provided herein can be different from the actual publication dates, which can require independent confirmation.

The patentable scope of the present disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Insofar as the description above and the accompanying drawing disclose any additional subject matter that is not within the scope of the claims below, the disclosures are not dedicated to the public and the right to file one or more applications to claims such additional disclosures is reserved.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the present invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

Aspects

The following disclose various Aspects of the present disclosure. The various Aspects are not to be construed as patent claims unless the language of the Aspect appears as a patent claim. The Aspects describe various non-limiting embodiments of the present disclosure.

Aspect 1. A method for securing and utilizing an improved heel guard, the method comprising: applying a first adhesive to a designated area of a floor surface; applying a second adhesive to bottom surface of the improved heel guard; placing the improved heel guard on the designated area of the floor surface; and applying sustained pressure to the improved heel guard for a threshold time period necessary for the first and second adhesive to cure and hold in place contiguous to the improved heel guard and a vehicle floor mat.

Aspect 2. A method for adhering an improved heel guard, the method comprising: applying adhesive contiguous to a bottom surface of an improved heel guard; placing the improved heel guard on a vehicle floor mat; and applying pressure to the improved heel guard thereby securing the improved heel guard to the vehicle floor mat.

Aspect 3. A method for adhering an improved heel guard to a vehicle floor mat, the method comprising: applying an adhesive contiguous to a bottom surface of an improved heel guard; cutting around an aperture in the vehicle floor mat to prevent the improved heel guard from sticking to the vehicle floor surface under the vehicle floor mat; placing the improved heel guard on a vehicle floor mat; and applying pressure to the improved heel guard thereby securing the improved heel guard to the vehicle floor mat.

Aspect 4. A method for adhering an improved heel guard to a vehicle floor mat, the method comprising: applying an adhesive contiguous to a bottom surface of an improved heel guard; cutting a small piece of a medium in a shape of an aperture in the vehicle floor mat, to prevent the improved from adhering through the aperture to a vehicle subfloor; placing the improved heel guard on the vehicle floor mat; and applying pressure to the improved heel guard thereby securing the improved heel guard to the vehicle floor mat.

Aspect 5. A method for adhering an improved heel guard to a vehicle floor mat, the method comprising: applying an adhesive contiguous to a bottom surface of an improved heel guard; placing the adhesive around border perimeter edges of the improved heel guard, preventing a central portion of the improved heel guard from adhering to the vehicle floor surface; placing the improved heel guard on the vehicle floor mat; and applying pressure to the improved heel guard thereby securing the improved heel guard to the vehicle floor mat.

Aspect 6. A method for adhering an improved heel guard to a vehicle floor mat, the method comprising: applying an adhesive contiguous to a bottom surface of an improved heel guard, wherein the adhesive covers a maximum portion of the bottom surface of the improved heel guard; placing the improved heel guard on a vehicle floor mat; and applying pressure to the improved heel guard thereby securing the improved heel guard to the vehicle floor mat.

Disclosed herein are methods and systems for providing an improved heel guard comprising at least one of a protective substrate having an outer layer higher than an inner layer with one or more ribs, an adhesive system comprising at least one adhesive, and other accessories. In at least one instance, the improved heel guard wherein the protective substrate layer comprises at least one of rubber, plastic, synthetic chemical compounds, natural compounds, water resistant compounds, odor repellent compounds, and other effective compounds. The present disclosure provides for the improved heel guard herein referred to at least one of the following terms such as, for example a mat protector, floor mat heel guard.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A heel guard for mitigation of damage to a floor mat, the heel guard comprising:
    a rectangular body comprised of two oppositely positioned long edges connected to two oppositely positioned short edges; and
    a contact surface of an upper portion of the rectangular body, the contact surface being a depression configured to contact and cushion a heel of a shoe or a foot of a driver, wherein the depression is defined by an elevated ridge positioned around a perimeter of the rectangular body;
    wherein a volume, defined by the contact surface and the elevated ridge, receives and holds debris from the shoe or the foot of the driver and decreases contact of the floor mat with the debris;
    wherein the perimeter of the rectangular body comprises side walls extending substantially perpendicular to the contact surface; and
    wherein an outer edge of a lower portion of the rectangular body curves inward from the side walls and connects the side walls to a bottom surface of the rectangular body.

2. The heel guard of claim 1, further comprising a plurality of friction grooves that extend into the contact surface a certain depth and provide additional grip to the heel of the shoe or the foot of the driver when contacted.

3. The heel guard of claim 2, wherein the heel guard is weatherproof and/or tamper resistant.

4. The heel guard of claim 3, wherein the heel guard is comprised of a rounded rectangular shape.

5. The heel guard of claim 1, wherein the bottom surface comprises a planar portion extending substantially parallel to the contact surface, and wherein the planar portion is located inward from the side walls.

6. The heel guard of claim 1, wherein the bottom surface of the heel guard comprises an adhesive applied thereon, the adhesive comprising an aperture.

7. The heel guard of claim 1, wherein the bottom surface of the heel guard comprises an adhesive applied only to the perimeter of the bottom surface.

8. A kit for mitigation of damage to a floor mat, the kit comprising:
    a heel guard, the heel guard comprising:
    a rectangular body comprised of two oppositely positioned long edges connected to two oppositely positioned short edges;
    a contact surface of an upper portion of the rectangular body, the contact surface being a depression configured to contact and cushion a heel of a shoe or a foot of a driver, wherein the depression is defined by an elevated ridge positioned around a perimeter of the rectangular body;
        wherein a volume, defined by the contact surface and the elevated ridge, receives and holds debris from the shoe or the foot of the driver and decreases contact of the floor mat with the debris;
        wherein the perimeter of the rectangular body comprises side walls extending substantially perpendicular to the contact surface; and
        wherein an outer edge of a lower portion of the rectangular body curves inward from the side walls and connects the side walls to a bottom surface of the rectangular body, and
    an adhesive configured to secure the heel guard to a surface.

9. The kit of claim 8, further comprising a plurality of friction grooves that extend into the contact surface a certain depth and provide additional grip to the heel of the shoe or the foot of the driver when contacted.

10. The kit of claim 9, wherein the heel guard is weatherproof and/or tamper resistant.

11. The kit of claim 10, wherein the heel guard is comprised of a rounded rectangular shape.

12. The kit of claim 8, wherein the bottom surface comprises a planar portion extending substantially parallel to the contact surface, and wherein the planar portion is located inward from the side walls.

13. The kit of claim 8, wherein the bottom surface of the heel guard comprises an adhesive applied thereon, the adhesive comprising an aperture.

14. The kit of claim 8, wherein the bottom surface of the heel guard comprises an adhesive applied only to the perimeter of the bottom surface.

15. The kit of claim 8, further comprising:
an intermediate material configured to be inserted between the heel guard and the adhesive.

16. The kit of claim 8, further comprising:
the floor mat, wherein the floor mat defines the surface to which the heel guard is secured, and wherein the floor mat is rectangular and comprises two long edges connected to two short edges positioned opposite the two long edges,
wherein the heel guard is configured to be secured to the floor mat such that the two oppositely positioned long edges of the rectangular body of the heel guard are aligned with the two short edges of the floor mat, and the two oppositely positioned short edges of the rectangular body of the heel guard are aligned with the two long edges of the floor mat.

17. A method for mitigating damage to a floor mat, the method comprising:
applying a first adhesive to a space of the floor mat and/or applying a second adhesive to a bottom surface of a heel guard;
placing the heel guard over the space;
contacting the first adhesive with the second adhesive, contacting the first adhesive with the bottom surface of the heel guard, or contacting the second adhesive with the space of the floor mat; and
applying a pressure to a top surface of the heel guard to bond the first adhesive and/or the second adhesive and secure the heel guard to the space,
wherein when a portion of the space of the floor mat is maximally damaged, contact between the first and/or the second adhesive and a surface underlying the floor mat is prevented by at least one of (i) cutting an aperture in the first and/or the second adhesive, (ii) inserting an intermediate material between the heel guard and the space of the floor mat, (iii) applying the first adhesive only to a perimeter of the space of the floor mat or (iv) applying the second adhesive only to a perimeter of the bottom surface of the heel guard.

18. The method of claim 17, wherein when the space of the floor mat is not maximally damaged, applying the second adhesive to the bottom surface of the heel guard involves applying the second adhesive to a majority of the bottom surface.

19. The method of claim 17, further comprising:
sizing the aperture in the first and/or the second adhesive and/or sizing the intermediate material to correspond with the portion of the space of the floor mat that is maximally damaged.

\* \* \* \* \*